July 4, 1950 — W. H. RUPP — 2,514,294
DISTILLATION OF C₁-C₆ HYDROCARBON MIXTURES
Filed Jan. 2, 1947
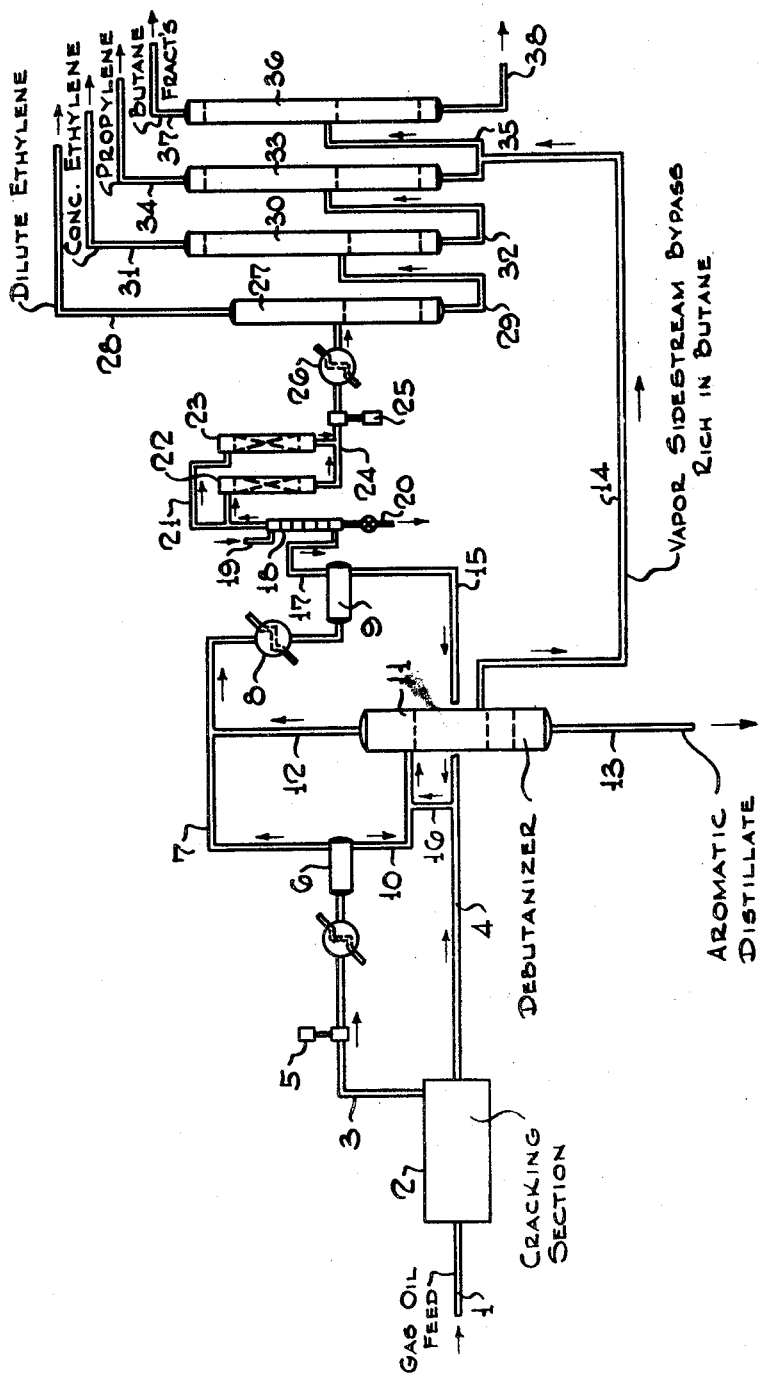
Walter H. Rupp   Inventor
By  J. C. Small   Attorney Patented July 4, 1950

2,514,294

UNITED STATES PATENT OFFICE 2,514,294

DISTILLATION OF $C_1$–$C_6$ HYDROCARBON MIXTURES

Walter H. Rupp, Mountainside, N. J., assignor to Standard Oil Development Company, a corporation of Delaware Application January 2, 1947, Serial No. 719,847

3 Claims. (Cl. 202—40)

This invention relates to improvements in the separation of hydrocarbons having from one to six carbon atoms to the molecule and relates particularly to improvements in the separation of diolefinic type hydrocarbons obtained by steam cracking gas oils.

The operability and capacity of fractionating equipment used limits the quantity of gas oil that may be steam cracked when the conditions are adjusted to produce maximum ethylene and maximum diolefins of the butadiene type and of the pentadiene type such as isoprene, cyclopentadiene, etc. Alumina or silica gel or the like desiccants used to dehydrate a mixture of $C_1$ to $C_6+$ hydrocarbons results in a rubbery polymer formation due to the presence of $C_4$, $C_5$ and heavier diolefinic hydrocarbons and interferes with the separation of the various gases into segregated $C_2$, $C_3$, $C_4$, $C_5$ and $C_6$ fractions of high purity.

According to this invention, the operability and capacities of the light ends high pressure fractionating towers (demethanizer, and deethanizer and depropanizer) can be greatly increased by removing the $C_4$ and $C_5$ hydrocarbons, particularly the diolefinic compounds normally contained in the feeds to these towers. The wide mixture of $C_1$ to $C_6+$ hydrocarbons is separated into $C_1$ to $C_3$ fractions requiring dehydration for final separation and $C_4$ to $C_6+$ fractions not requiring dehydration for ultimate fractionation. The $C_4$ to $C_6+$ fractions contain the unstable and highly heat-reactive diolefinic compounds which are valuable raw materials for rubber and chemical manufacture.

This invention will be more clearly understood by reading the following description with reference to the accompanying drawing:

Gas oil feed is passed through pipe 1 to a steam cracking section 2. From cracking section 2 is passed a gas consisting of $C_1$ to $C_6+$ hydrocarbons through pipe 3 and a liquid through pipe 4. The gas is compressed by means of compressor 5 and passed to separator 6. From separator 6 a gas is passed by means of pipe 7 through condenser 8 to second separator 9. A liquid consisting of $C_1$ to $C_6+$ hydrocarbons from separator 6 is passed by means of pipe 10 to the upper part of a debutanizer tower 11. Predominately $C_1$ to $C_3$ hydrocarbons, together with some $C_4$ hydrocarbons, are fractionated in tower 11 and pass from tower 11 through pipe 12 to pipe 7. An "aromatic" distillate consisting of $C_5$ hydrocarbons and higher fractions, boiling up to about 400° F. are removed through pipe 13 from tower 11 and passed to storage not shown. A sidestream from the middle section of the tower, normally from plate 5 above the bottom, consisting of a vapor rich in $C_4$ to $C_6$ hydrocarbons, is removed from tower 11 by means of pipe 14. A separate tower can be used if desired to fractionate the bypass stream rich in $C_4$ to $C_6$ hydrocarbons instead of removing the sidestream from a single tower. A pressure of about 50–250 pounds per square inch, normally about 175 pounds per square inch is maintained in the debutanizer tower. The liquid from the separator 9 is removed by means of pipe 15 and returned to pipe 4 and passed by means of pipe 16 into pipe 10 where it is passed to the debutanizer tower 11. The purified $C_1$ to $C_3$ hydrocarbons are substantially free of unstable and gum-forming diolefins before being passed from separator 9 by pipe 17 to wash tower 18 where caustic soda solution is introduced by means of pipe 19 and removed by means of pipe 20 from the bottom of the tower. Washed gas is then passed by means of pipe 21 to alumina dehydrators 22 and 23 where a temperature of 50–80° F., normally about 60° F. is maintained. Only one dehydrator is used at a time while the other is being regenerated by means of hot gases. The said hot gases normally natural gases containing predominately methane are introduced into the tower and removed by means of pipes not shown. The dehydrated hydrocarbons are then passed by means of pipe 24 to compressor 25 where the pressure is raised up to about 350 to 600 p. s. i. g., normally about 550 pounds per square inch. A heat exchanger 26 is provided to cool the gas to about −40° F. Gases are passed into fractionating tower 27 where a temperature of −40° F. and a pressure of 550 pounds per square inch is normally maintained to condense reflux for fractionation purposes.

Dilute ethylene is removed from the upper part of the tower by means of pipe 28. The residual hydrocarbons are then passed through pipe 29 to tower 30 where a temperature of 35° F. and a normal pressure of about 510 pounds per square inch is maintained in order to condense ethane-ethylene fractions as liquid reflux. Concentrated ethylene is removed from the upper part of the tower by means of pipe 31. The residual gas is then passed by means of pipe 32 through fractionating tower 33 where a temperature of 125° F. and a pressure of about 300 pounds per square inch is maintained.

Propylene is removed from the fractionating tower 33 by means of pipe 34. The residual hydrocarbons are then passed by means of pipe 35 into butane-pentane tower 36 together with C4 and C5 hydrocarbon containing the unstable diolefins that have removed as a sidestream from tower 11 by means of pipe 14 and bypassed around the alumina dehydrators. A temperature of 140° F. and a pressure of 90 pounds per square inch is maintained in tower 36. Butene fractions are removed by means of pipe 37, and C5 and higher hydrocarbons are removed by means of pipe 38.

The sidestream rate is maintained at such a rate that most of the diolefinic materials will be bypassed around the demethanizer, de-ethanizer and depropanizer towers, and therefore avoid the necessity of being dehydrated. A typical analysis of this stream shows 71, 22 and 7 mol percent respectively of $C_4$, $C_5$ and $C_6+$. By means of the sidestream it is possible to bypass approximately 50 to 90% of the total $C_4$, and 70 to 95% of the $C_5$ and heavier components normally contained in the feed to the high pressure fractionating towers, around the demethanizer, de-ethanizer and depropanizer towers, directly to the butane-pentane tower. This results in a large decrease in the liquid load on the lower section of the de-ethanizer and depropanizer towers with a subsequent improvement in stripping efficiency and ethylene recovery. In addition, with the reduced load on the lower section of the demethanizer, it was possible to switch to a lower feed point on this tower, which provided increased fractionating capacity and subsequently permitted an increase in the overhead rate without exceeding the $C_3$ specification on the overhead (0.1 weight per cent maximum). As a result of the improved operation and increased capacity of the two ethylene towers, the total recovered ethylene production has increased appreciably. A further advantage of by-passing heavy fractions around the high pressure fractionating equipment is the decreased load on the dehydrators which results in increased desiccant life and greater water removal reserve capacity for a given ethylene production rate.

Actual operations have shown that the $C_4$-$C_5$ diolefin content of the gas stream passing through pipe 17 to dehydrator 23 is reduced to 10 to 30% of the content existent without the sidestream of $C_4$-$C_6+$ fractions in use. Since the alumina dehydrating agent is regenerated by a hot gas blow (350–600° F.), any residual $C_4$-$C_5$ diolefins, or even $C_4$-$C_5$ olefins present in the dehydrator vessels tend to polymerize very rapidly to carbon and gums which destroy the ability of the drying agent to absorb water. Unless water is completely removed, the subsequent demethanizer and de-ethanizer towers become plugged with ice and inoperable due to the low temperatures required to fractionate methane and ethane from the gas streams.

By removing $C_4$, $C_5$ and $C_6$ hydrocarbons from the demethanizer, de-ethanizer and depropanizer tower bottoms streams, temperatures are reduced, thereby relieving the tendencies of the diolefins to polymerize. When diolefins polyerize in the towers and reboilers, the rubbery polymers formed will plug up the equipment and render it inoperable.

I claim:
1. In the fractionation of a mixture of saturated and unsaturated hydrocarbons containing diolefins and having from one to six carbon atoms in the molecule, the improvement which comprises fractionating the mixture in an initial fractionation zone to obtain therefrom a vaporous fraction having one to three carbon atoms in the molecule and substantially completely free of diolefins, a second vaporous fraction containing diolefins and having from four to five carbon atoms in the molecule and a third fraction containing six and more carbon atoms in the molecule, separately removing said fractions from said zone, passing said fraction having from one to three carbon atoms in the molecule through a dehydration zone, and thence through a series of fractionation zones from which dilute ethylene vapor is recovered overhead from the first zone, concentrated ethylene vapor is recovered overhead from a second zone, and propylene vapor overhead from a third zone, a liquid condensate from each of the first and second zones being introduced into the second and third zones respectively under conditions of increasing temperature and decreasing pressure in each succeeding zone, removing a liquid condensate from said third zone and passing said condensate and said second vaporous fraction from the intial fractionation zone to a fourth fractionation zone in said series of zones under higher temperature and lower pressure than in said preceding zones of the series, and separately removing therefrom a vaporous fraction and a fraction primarily containing more than four carbon atoms to the molecule.

2. Process as defined by claim 1 wherein the pressure in said first tower is about 550 pounds per square inch and the temperature of said first zone is about −40° F., wherein the pressure of the second zone is about 510 pounds per square inch and the temperature in the second zone is about 35° F., and wherein the pressure in said third zone is about 300 pounds per square inch and the temperature in said third zone is about 125° F., and wherein the pressure in said fourth zone is about 140° F. and the pressure is about 90 pounds per square inch.

3. Process as defined by claim 1 wherein said fraction having from one to three carbon atoms in the molecule which is removed from said initial fractionation zone, is cooled and passed to a separation zone prior to introducing the vapors into said dehydration zone, whereby a liquid phase is secured in said latter separation zone, and wherein said separated liquid phase is removed from said latter separation zone and recycled to said initial fractionation zone with the mixture of saturated and unsaturated hydrocarbons fed to said initial zone.

WALTER H. RUPP.

REFERENCES CITED

The following references are of record in the file of this patent:

UNITED STATES PATENTS

| Number | Name | Date |
|---|---|---|
| 2,168,610 | Schutt | Aug. 8, 1939 |
| 2,187,631 | Schutt | Jan. 16, 1940 |
| 2,258,016 | Keith, Jr., et al. | Oct. 7, 1941 |
| 2,340,778 | Stewart et al. | Feb. 1, 1944 |
| 2,348,659 | Smith et al. | May 9, 1944 |
| 2,363,903 | Smith | Nov. 28, 1944 |